(12) United States Patent
Uln et al.

(10) Patent No.: US 8,081,615 B2
(45) Date of Patent: Dec. 20, 2011

(54) METHOD AND APPARATUS TO ALLOW COEXISTENCE BETWEEN WIRELESS DEVICES

(75) Inventors: Kiran Uln, Pleasonton, CA (US); John Wong, San Jose, CA (US); Gary Allen Anwyl, Palo Alto, CA (US); Thomas Edward Pare, Jr., Mountain View, CA (US)

(73) Assignee: Mediatek Inc., Hsin-Chu (TW)

( * ) Notice: Subject to any disclaimer, the term of this patent is extended or adjusted under 35 U.S.C. 154(b) by 146 days.

(21) Appl. No.: 12/471,187

(22) Filed: May 22, 2009

(65) Prior Publication Data

US 2010/0091670 A1 Apr. 15, 2010

Related U.S. Application Data

(60) Provisional application No. 61/104,693, filed on Oct. 10, 2008.

(51) Int. Cl.
*H04W 4/00* (2009.01)
(52) U.S. Cl. ............................................ 370/338
(58) Field of Classification Search .................. None
See application file for complete search history.

(56) References Cited

U.S. PATENT DOCUMENTS

| | | | |
|---|---|---|---|
| 6,697,013 B2 | 2/2004 | McFarland et al. | |
| 6,831,589 B2 | 12/2004 | Shearer | |
| 6,870,815 B2 | 3/2005 | McFarland et al. | |
| 6,891,496 B2 | 5/2005 | Husted et al. | |
| 6,954,171 B2 | 10/2005 | Husted et al. | |
| 7,107,032 B2 | 9/2006 | Li | |
| 7,129,884 B1 | 10/2006 | Tehrani et al. | |
| 7,155,230 B2 | 12/2006 | Tsien | |
| 7,280,067 B2 | 10/2007 | Chiodini | |
| 7,453,857 B2* | 11/2008 | Mangold et al. | 370/338 |
| 7,664,465 B2* | 2/2010 | Shen et al. | 455/63.1 |
| 2002/0181426 A1* | 12/2002 | Sherman | 370/338 |
| 2003/0123420 A1* | 7/2003 | Sherlock | 370/338 |
| 2004/0028003 A1 | 2/2004 | Diener et al. | |
| 2004/0165564 A1 | 8/2004 | Kim et al. | |
| 2005/0007979 A1 | 1/2005 | Tsien et al. | |
| 2005/0032479 A1 | 2/2005 | Miller et al. | |
| 2005/0059363 A1 | 3/2005 | Hansen | |
| 2005/0059364 A1 | 3/2005 | Hansen et al. | |
| 2005/0162304 A1 | 7/2005 | Mitsugi | |

(Continued)

OTHER PUBLICATIONS

A. Burg, et al., "VLSI Implementation of the Sphere Decoding Algorithm", Integrated Systems Laboratory, Eidgenossische Tech. Hochschule, Zurich, Switzerland, Solid-State Circuits Conference, Sep. 2004, ESSCIRC 2004, Proceeding of the 30th European, pp. 303-306.

(Continued)

*Primary Examiner* — Min Jung
(74) *Attorney, Agent, or Firm* — Sawyer Law Group, P.C.

(57) ABSTRACT

The present invention relates generally to wireless transceivers, and more particularly but not exclusively to non 802.11 detection and avoidance methodologies for wireless devices including transceivers. In one or more implementations, a method for detecting non 802.11 operating in the unlicensed 5.25-5.35 and 5.47-10.725 GHz radio bands, using wireless devices, such as AP, are provided. An AP is used to automatically detect the presence of non 802.11 on all channels in these bands, alert all of its clients, and move to another channel that is known to be devoid of non 802.11 using one or more implementations.

18 Claims, 6 Drawing Sheets

U.S. PATENT DOCUMENTS

| | | | |
|---|---|---|---|
| 2006/0029023 A1* | 2/2006 | Cervello et al. | 370/333 |
| 2006/0082489 A1 | 4/2006 | Liu et al. | |
| 2006/0193299 A1* | 8/2006 | Winget et al. | 370/338 |
| 2006/0209972 A1 | 9/2006 | Lemberger et al. | |
| 2007/0149230 A1* | 6/2007 | Song et al. | 455/515 |
| 2007/0280332 A1* | 12/2007 | Srikanteswara et al. | 375/130 |
| 2007/0281638 A1 | 12/2007 | Hansen | |
| 2009/0129273 A1* | 5/2009 | Zou | 370/235 |
| 2009/0268671 A1* | 10/2009 | Cave et al. | 370/328 |
| 2010/0061262 A1* | 3/2010 | Awater et al. | 370/252 |

OTHER PUBLICATIONS

Michael Pohst, "On the Computation of Lattice Vectors of Minimal Length, Successive Minima and Reduced Basis with Applications", Mathematisches Institute, /SIGSAM Bull./15, Feb. 1, 1981, pp. 37-44.

Babak Hassibi and Haris Vikalo, "On the Sphere-Decoding Algorithm I. Expected Complexity", IEEE Transactions on Signal Processing, vol. 53, No. 8, Aug. 2005, pp. 2806-2818.

Lei Wei, et al., "A Minimax Robust Decoding Algorithm", IEEE Transaction on Information Theory, vol. 46, No. 3, May 2000, pp. 1158-1167.

D. Wubben, et al., "Efficient Algorithm for Detecting Layered Space-Time Codes", 4th International ITG Conference on Source and Channel Coding, Berlin, Jan. 2002, pp. 1-7.

Luis G. Barbero, John S. Thompson, "Rapid Prototyping of a Fixed-Throughput Sphere Decoder for MIMO Systems", Bell Labs, Jun. 2006, The University of Edinburgh, Institute for Digital Communications, 74 pages.

IEEE P802.11n/D4.00, "Draft Standard for Information Technology—Telecommunications and information exchange between systems—Local and metropolitan area networks—Specific requirements—Part 11: Wireless LAN Medium Access Control (MAC) and Physical Layer (PHY) specifications: Amendment 4: Enhancements for Higher Throughput," Prepared by the 802.11 Working Group of the 802 Committee, Mar. 2008, pp. 312-314.

Bluetooth Specification Version 1.0A, "Radio Specification", Jul. 24, 1999, pp. 17-32 of 1068.

IEEE Standard 802.15.4-2003, "Wireless MAC and PHY Specifications for LR-WANS", Annex E and F, 2003, pp. 637-668.

FCC 06-96, "Memorandum Opinion and Order", Appendix "Compliance Measurement Procedures for Unlicensed National Information Infrastructure Devices (D-NII) Operating in the 5250-5350 and 5470-5725 MHz Bands Incorporating Dynamic Frequency Selection", Jun. 30, 2006.

ETSI EN 301 893 v1.2.3 (Aug. 2003), "Broadband Radio Access Networks (BRAN); 5 GHz high performance RLAN; Harmonized EN covering essential requirements of article 3.2 of the R&TTE Directive", Aug. 2003, pp. 1-43.

C.H. Wen, "Radar Detection for DFS2—A New Approach", Ralink Technology (Singapore) Corporation PTE. LTD., Jul. 3, 2007, 33 pages.

T. Pare, "RT2883 Radar Detection, Design Review", Ralink Technology (Singapore) Corporation PTE. LTD., Jun. 19, 2007, 23 pages.

* cited by examiner

METHOD AND APPARATUS TO ALLOW COEXISTENCE BETWEEN WIRELESS DEVICES

CROSS-REFERENCE TO RELATED PATENT APPLICATIONS

This application is related to provisional patent application Ser. No. 61/104,693, filed Oct. 10, 2008, entitled "A Method and Apparatus to Allow Coexistence Between Wireless Devices," and assigned to the assignee of the present application, and also to co-pending U.S. patent application Ser. No. 11/963,658, filed Dec. 21, 2007, entitled, "A Configurable Radar Detection and Avoidance System for Wireless OFDM Transceivers," both of which are incorporated by reference in their entirety herein.

FIELD OF THE INVENTION

The present invention relates generally to wireless transceivers, and more particularly but not exclusively to non 802.11 detection and avoidance methodologies for wireless devices including transceivers.

BACKGROUND OF THE INVENTION

Presently, it is known that the ISM bands are becoming crowded, with many different types of wireless devices, among those being WiFi (802.11), BlueTooth (802.15.1), and Zigbee (802.15.4), cordless phones, and others. It is understood that when these devices operate in close proximity, interference between the devices may cause performance loss, or severe degradation for particular devices. In some cases, one particular device may be rendered inoperable, and lose wireless connectivity completely. There is a need in the industry for these devices to share the limited band so that all devices may function properly, and most desirably, with little or no performance degradation.

One particularly concerning interference problem is known to occur between existing non 802.11 devices such as Blue Tooth and Zigbee devices, and WiFi devices based on the upcoming 802.11n standard, which allows devices to operate at 40 MHz wide channels. A 40 MHz WiFi channel overlaps excessively with the Non 802.11 channel, and can interrupt Non 802.11 operation. Although the Non 802.11 is equipped with interference avoidance schemes like Adaptive Frequency Hopping (AFH), a wide bandwidth of 40 MHz WiFi channel will cause this mechanism to fail, and Non 802.11 performance to degrade. This occurs because the overlap with a 40 MHz WiFi channel can block out up to 75% of the Non 802.11 bandwidth. This particular problem is of great concern because of the deployment of WiFi and Non 802.11 devices is so widespread across the world.

A potential coexistence issue has been identified between Non 802.11 wireless devices (IEEE 802.15.1) and IEEE 802.11n in WiFi products, operating in the 2.4 GHz ISM band. An 802.11n STA operating with 40 MHz wide channels can degrade the performance of Non 802.11 headsets. One possible coexistence solution is for the 802.11n device to scan for the presence of non-802.11n devices, and switch to 20 MHz operation to avoid this conflict.

Industry standards often require interoperability, whenever possible, between different devices operating in the same frequency band. To avoid interference, devices will reduce transmit power levels, or move to a different channel in the band, or time-share the same channel. For the particular problem of WiFi/Non 802.11 interference, both devices have been shown to coexist, provided the WiFi device can properly detect the presence of a Non 802.11 device and appropriately limit operation to 20 MHz bandwidth. With the operation limited to 20 MHz, the Non 802.11 AFH feature enables the Non 802.11 device to operate in the remaining bandwidth, and avoid interference with the WiFi transmissions. This particular method of detecting the presence Non 802.11 devices, and backing off to 20 MHz operation to allow coexistence is recommended in the discussions at IEEE 802.11n standard (Draft 6.0).

Therefore, it is highly desired to be able to provide a solution which overcomes the shortcomings and limitations of the present art and more particularly provides a configurable non 802.11 detection and avoidance method and system for wireless devices.

The present invention in accordance with its various implementations herein, addresses such needs.

SUMMARY OF THE INVENTION

In various implementations of the present invention, a configurable non 802.11 detection and avoidance system is provided for wireless devices, thereby providing improved non 802.11 detection, timely transfers of communications to another channel as needed, and compliance with associated standards and specifications and coexistence between clients.

The present invention in various implementations provides for a configurable non 802.11 detection and avoidance system for wireless devices operating in the unlicensed band range.

In one aspect, one or more wireless devices, such as an AP, is used to automatically detect the presence of non 802.11 on each operable channel within the unlicensed band range, alert the clients in communication with the wireless device, and transfer the operation to another channel that is known to be devoid of non 802.11, or a channel that produces the least interference to allow for coexistence of such clients.

In another aspect, a configurable non 802.11 detection system comprising: one or more non 802.11 detector modules each module capable of detecting non 802.11 signals of non 802.11 types different from one another, a detection and analysis module to determine non 802.11 presence from one or more detected non 802.11 signals of one or more non 802.11 detector modules, an automatic gain controller for controlling one or more detection parameters of one or more non 802.11 detector modules, and, report signals for reporting detected the presence and type of non 802.11 signals, is provided.

In other aspects, using one or more wireless devices, a configurable non 802.11 detection and avoidance system is provided for detecting periodic (short pulse), non-periodic (long pulse) waveforms. In further aspects, a configurable non 802.11 detection and avoidance system is provided operable in high data traffic situations. This can be used to detect and characterize undesirable interference from non wireless systems, like microwave, hair dryer, etc. The details of this aspect are disclosed in "A Configurable Radar Detection and Avoidance System for Wireless OFDM Transceivers," patent application Ser. No. 11/963,658, filed Dec. 21, 2007 and assigned to the assignee of the present invention, which is incorporated by reference in its entirety herein.

In another implementation, the present invention is a data system having computer-readable program code portions stored therein to.

DETAILED DESCRIPTION

The present invention relates generally to a system for non 802.11 detection and avoidance methodologies for wireless devices including transceivers.

The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

As used herein, as will be appreciated, the invention and its agents, in one or more implementations, separately or jointly, may comprise any of software, firmware, program code, program products, custom coding, machine instructions, scripts, configuration, and applications with existing software, applications and data systems, and the like, without limitation.

U.S. patent application, Ser. No. 11/963,658, filed Dec. 21, 2007, entitled, "A Configurable Radar Detection and Avoidance System for Wireless OFDM Transceivers", incorporated in its entirety herein, details technology that can be applied to the non 802.11 detection and avoidance problem, with special reference to periodic and non-periodic repeating waveforms (like DFS radar). It includes a configurable signal detection module, which can be programmed so that the detection sensitivity can be optimized for the signature of the non 802.11 signal.

A key feature of the present invention is that the detection of non 802.11 signals is performed during normal 802.11n WiFi operation. When non 802.11 signals are detected, the system then directs a basic service set (BSS) to switch channels to a non 802.11-free channel or choose an operating mode that results minimum interference. To maintain high throughput during the non 802.11 detection process, it is essential that the non 802.11 scanning occur simultaneously with normal network operation. The device details several mechanisms in the baseband, MAC and software layers to support this feature, and modified elements of this design are part of a system and method in accordance with the present invention.

Figure 1:
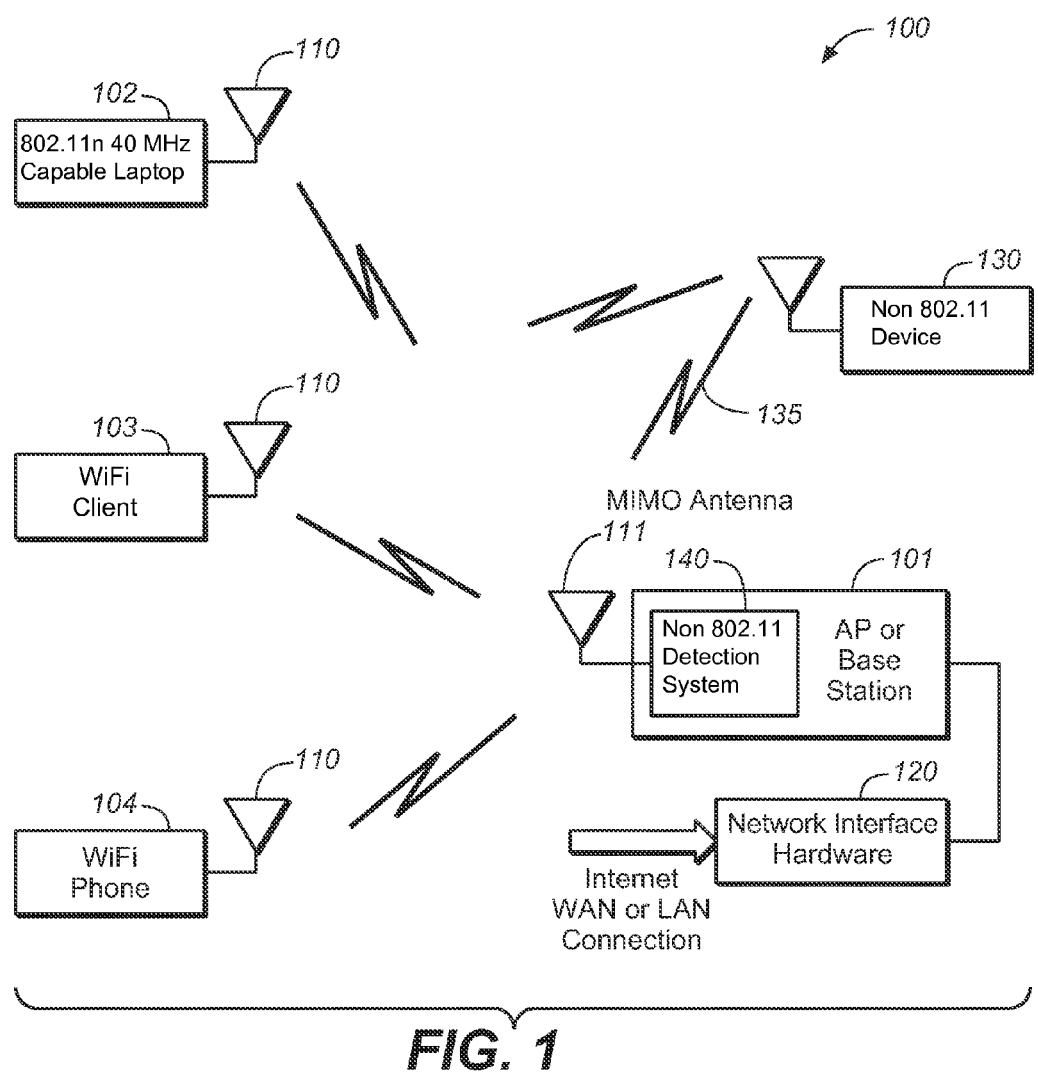
FIG. 1 depicts a diagram of a wireless local area network (WLAN) network having a WiFi phone detection and avoidance system, in accordance with one or more implementations.

FIG. 1 depicts a diagram of a wireless local area network (WLAN) network having a WiFi phone device detection and avoidance system in accordance with one or more implementations.

In FIG. 1, a WLAN system 100 is depicted with components (i.e., client devices, devices or clients) of the WLAN that are in communication or capable of communication with the AP 101 and one another, as each is comprised of communication capability 110 and technology associated with WiFi-equipped devices 111, for example. Client devices, such as 802.11n capable laptop computer 102, a WiFi client 103, or a WiFi (Skype) phone 104, are examples of clients, but the present invention and its associated implementations are not so limited. By further example the AP, or base station, 101 is also in communication with an internet WAN or a local area network (LAN) at 120.

From FIG. 1, each device is capable of wireless transmission back to the base station, or AP, using a standard communication protocol and modulation scheme, such as but not limited to IEEE802.11n. Examples of types of applications and services supported by this type of network include Internet browsing on a laptop, photo sharing with a network enabled camera, phone call conversations via a "WiFi" phone, video viewing or sourcing with a high definition television (HDTV) or video server, or audio streaming of internet radio programs. Typically, the network will operate in the ISM (industrial, scientific, and medical) frequency bands (2.4-2.5 GHz, 5.725-5.875 GHz). In addition, operating in the same band may be other non-802.11 wireless devices, not complying with the 802.11 standard. In the FIG. 1, the 802.11n network devices are capable of operating using both 20 MHz and 40 MHz wide channels.

In FIG. 1, the AP 101, while communicating with the clients, is also capable of detecting a non 802.11 source 130 on the communication channel via the non 802.11 detection system of the present invention 140, in one or more implementations. If a transmitted non 802.11 signal 135 is detected by the AP 161 via the non 802.11 detection system 140, the AP 101 will announce the presence of the non 802.11 detection by notifying the clients of a channel change, ceasing communication and changing all clients to a new channel that is known to be devoid of non 802.11 signals. If one of the clients (102, 103 or 104) detects the presence of the non 802.11 signal via the detection system, then, they will communicate the details to the AP and the AP will suitably respond. The detailed procedure is explained below.

Figure 2:
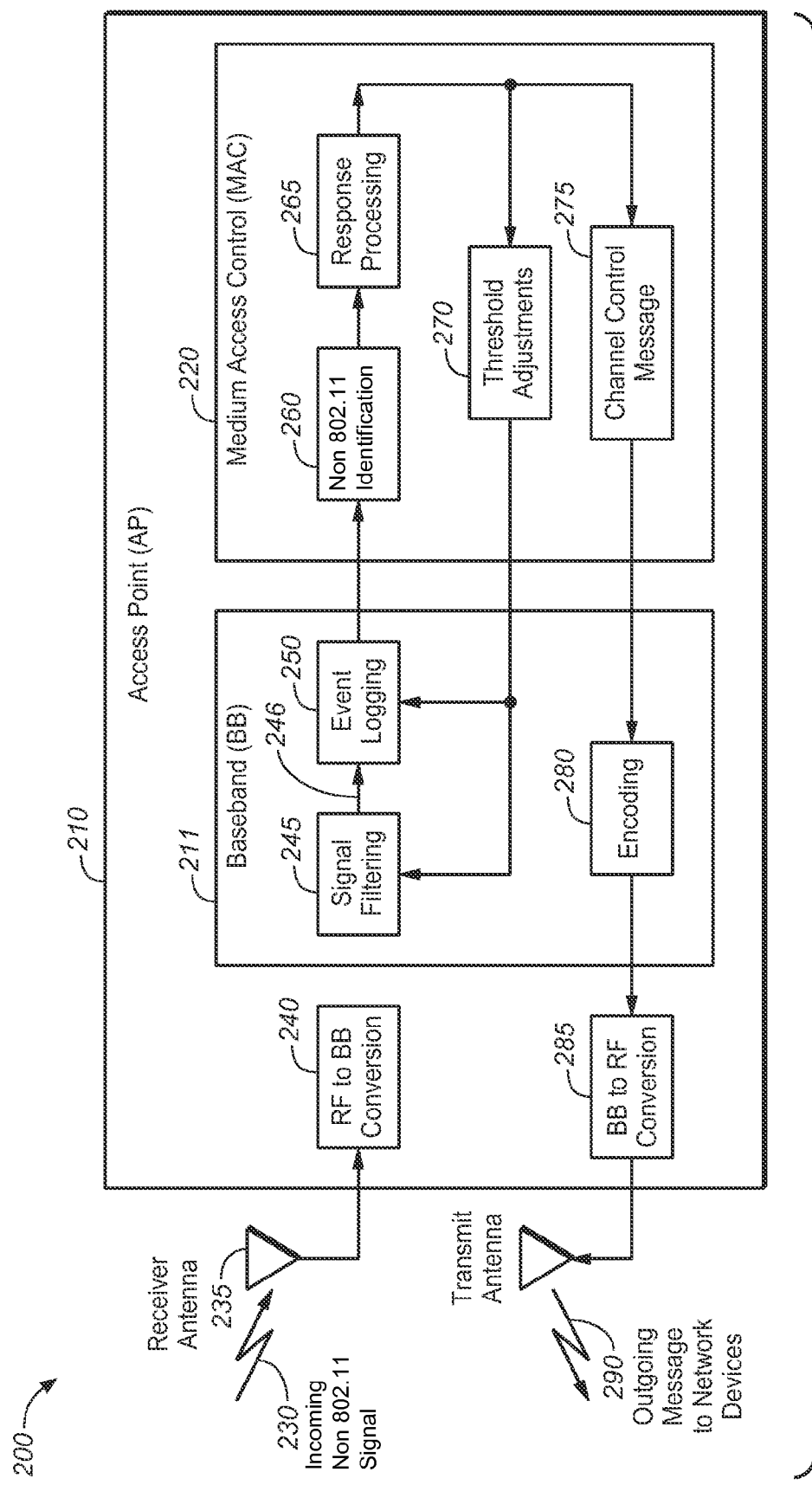
FIG. 2 depicts a diagram of the AP baseband (BB) and medium access layer (MAC) processing associated with non 802.11 detection, in accordance with one or implementations.

FIG. 2 depicts a diagram 200 of the AP baseband (BB) 211 and medium access layer (MAC) processing 220 associated with non 802.11 detection, in accordance with one or more implementations.

From FIG. 2, the AP 210 is equipped with the non 802.11 detection and avoidance system of the present invention, in one or more implementations. After the non 802.11 signal 230 enters (or is detected by) the receiver antenna 235, the detected signal is converted to baseband by a converter 240. A non 802.11 signal is output from the baseband non 802.11 filter block at 246, and is further referenced in FIG. 3. Non 802.11 waveforms are detected by measuring energy, spectral bandwidth, periodicity, pulse width, chirp rate, tone frequency, and other signal features, and these "events" are logged in the baseband by the event logger 250 for future pattern recognition processing. It will be appreciated by those skilled in the art that the event logger retains event data which enhances the detection reliability and therefore will also lower false-alarm rates for the present invention. Preferably, the event logger also has preset thresholds for event parameters and number of logged events. Upon the event logger reaching predetermined or preset thresholds for periodicity and number of events, these logged events (i.e., event results) are passed from the baseband 210 to the medium access layer 220. Preferably the MAC layer 220 is software-based and operates at a rate having a lower update requirement.

The logged events that are passed to the MAC along 255 are checked against known non 802.11 patterns, and optionally for self-consistency (e.g., persistence of a certain type of non 802.11), at the non 802.11 identification block 260. Optionally, the MAC response processing 265 modifies the baseband non 802.11 thresholds via the threshold adjustment block 270 in order to improve reliability of the non 802.11 detection. In an alternate implementation, instead of adjusting the threshold via 270, the MAC may declare the presence of a valid non 802.11 and initiate the appropriate response. Thereafter, a channel control message (CCM) or Management Action Frame (MAF) is prepared at 275 to be sent to the network clients. The CCM or MAF is optionally encoded at 280, converted to radio frequency at 285, and via the transmission from the AP at 290, in which the CCM contains information requesting all associated clients to change to an operating channel clear of non 802.11 signals, as designated to enable coexistence with Blue tooth signals. It will be understood by those skilled in the art that "associated client(s)" includes those clients and devices in or capable of communication with the AP.

Network Wide Response

There are two cases in which a non 802.11 device can enter a 40 MHz WiFi BSS environment, operating in the 2.4 GHz band: at the AP, or at one of the clients. As shown in FIG. 1, the non 802.11 device could be interfering at either the client, or AP.

If the non 802.11 enters the BSS in close proximity to the AP, the non 802.11 signal will be detected, and the system will respond by alerting the clients that are associated with the BSS that the network will switch to 20 MHz operation. This is accomplished by transmitting a Management Action Frame (MAF), which is a network wide announcement. This system functionality is shown in FIG. 2, which will be discussed in detail hereinafter.

Local (Client Response)

When the non 802.11 enters the WiFi network wireless area in close proximity to a remote station, or client, equipped with the functionality of the current invention, it will detect the non 802.11 signal, and send a message to the AP, alerting the network to the presence of a non 802.11 device. The AP then decodes this message, and sends out a MAF requesting a BSS operation switch to 20 MHz mode.

40 MHz Recovery Mode

Figure 3:
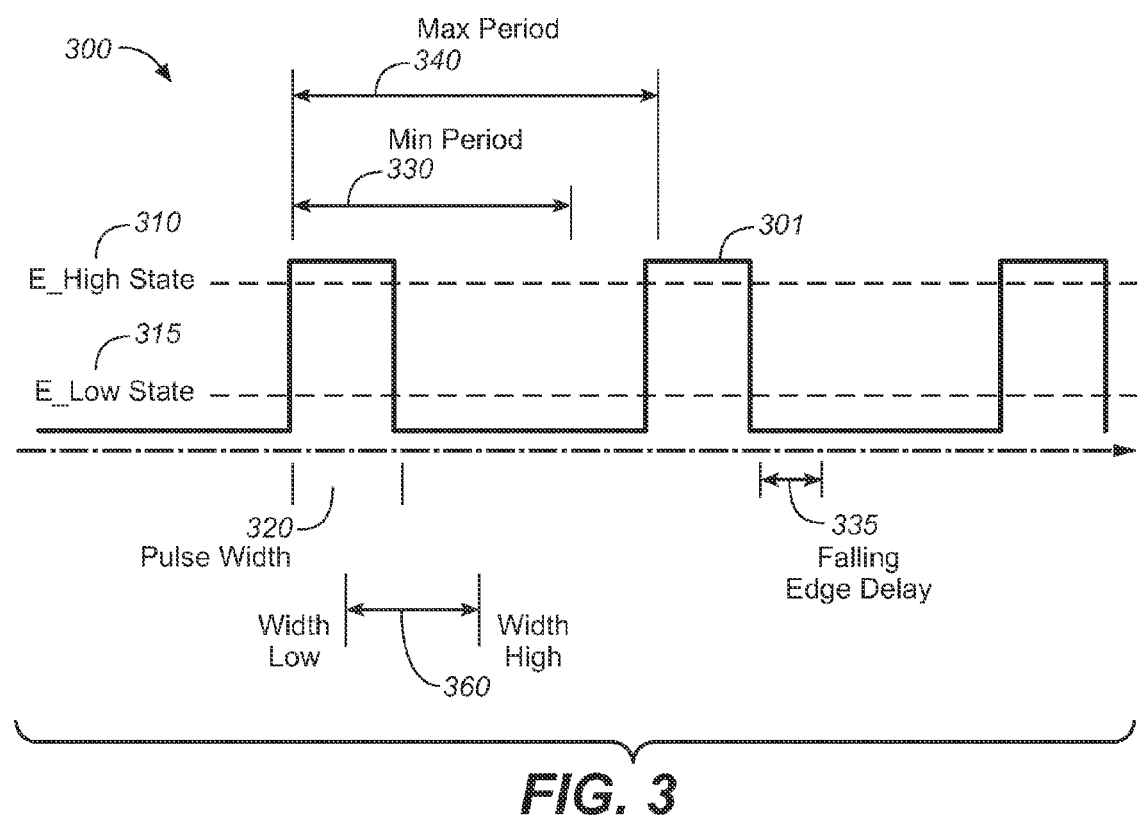
FIG. 3 depicts a non 802.11 signal 300 at the output of the baseband non 802.11 filter block (as depicted in FIG. 2 at 245), in accordance with one or more implementations.
Figure 3A:
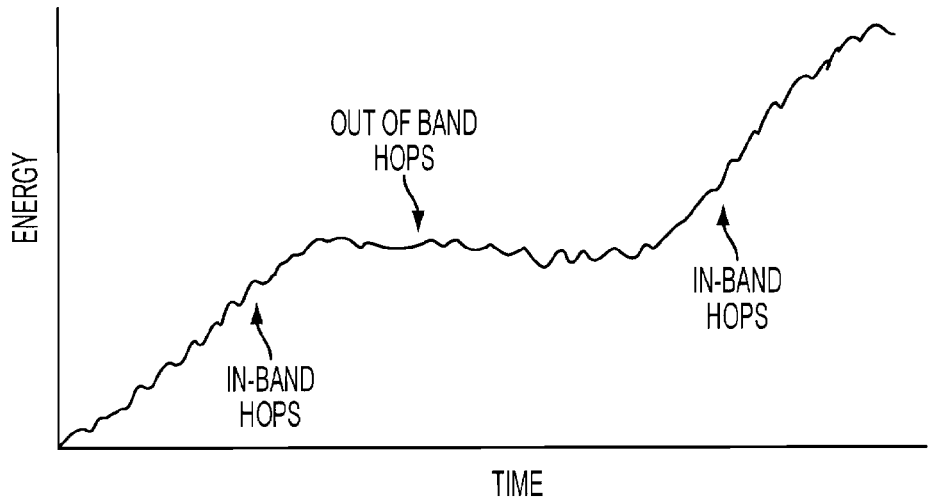
FIG. 3a shows a possible AFH signal hopping in (upwards ramp) and out (flat section) of the bandwidth of the 802 device.
Figure 3B:
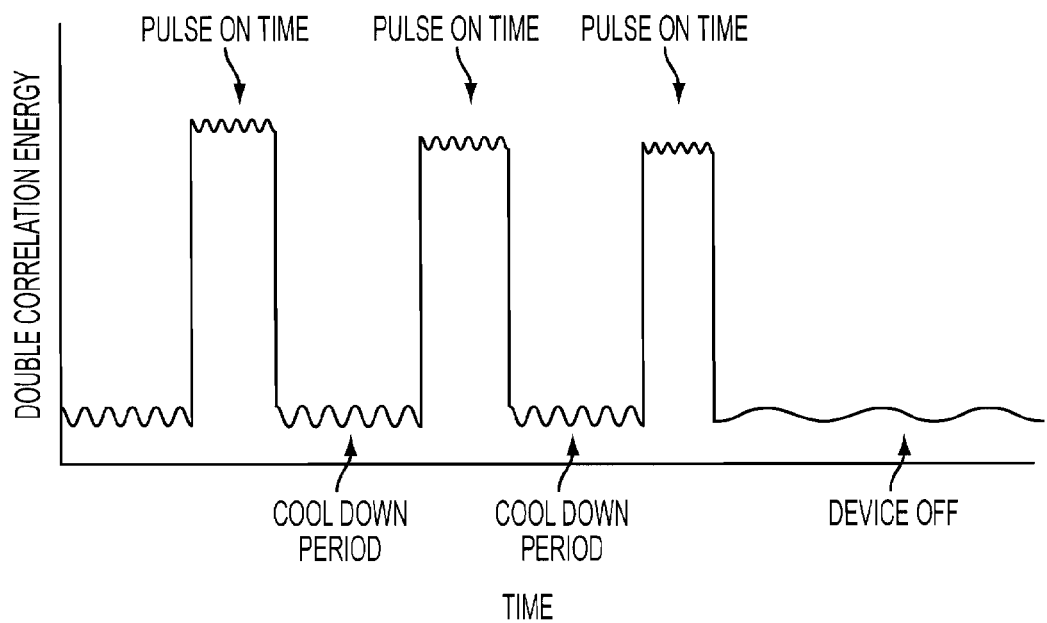
FIG. 3b shows a pulsed interferer like a microwave that causes interference.

After switching from 40 MHz to 20 MHz operation, the AP 210 and clients will operate in 20 Upper, or 20 Lower 40 MHz mode. This will allow the AP 210 and capable clients to continue to monitor the channel to detect whether the 40 MHz channel is free of interfering non 802.11 devices. After a period of time during which no non 802.11 devices are detected, the BSS can be safely moved back to 40 MHz operation, and thus improve network throughput FIG. 3 depicts a non 802.11 signal 300 at the output of the baseband non 802.11 filter block (as depicted in FIG. 2 at 246), in accordance with one or more implementations. FIG. 3a shows a possible AFH signal hopping in (upwards ramp) and out (flat section) of the bandwidth of the 802.11 device. FIG. 3b shows a pulsed interferer like a microwave that causes interference.

Figure 4:
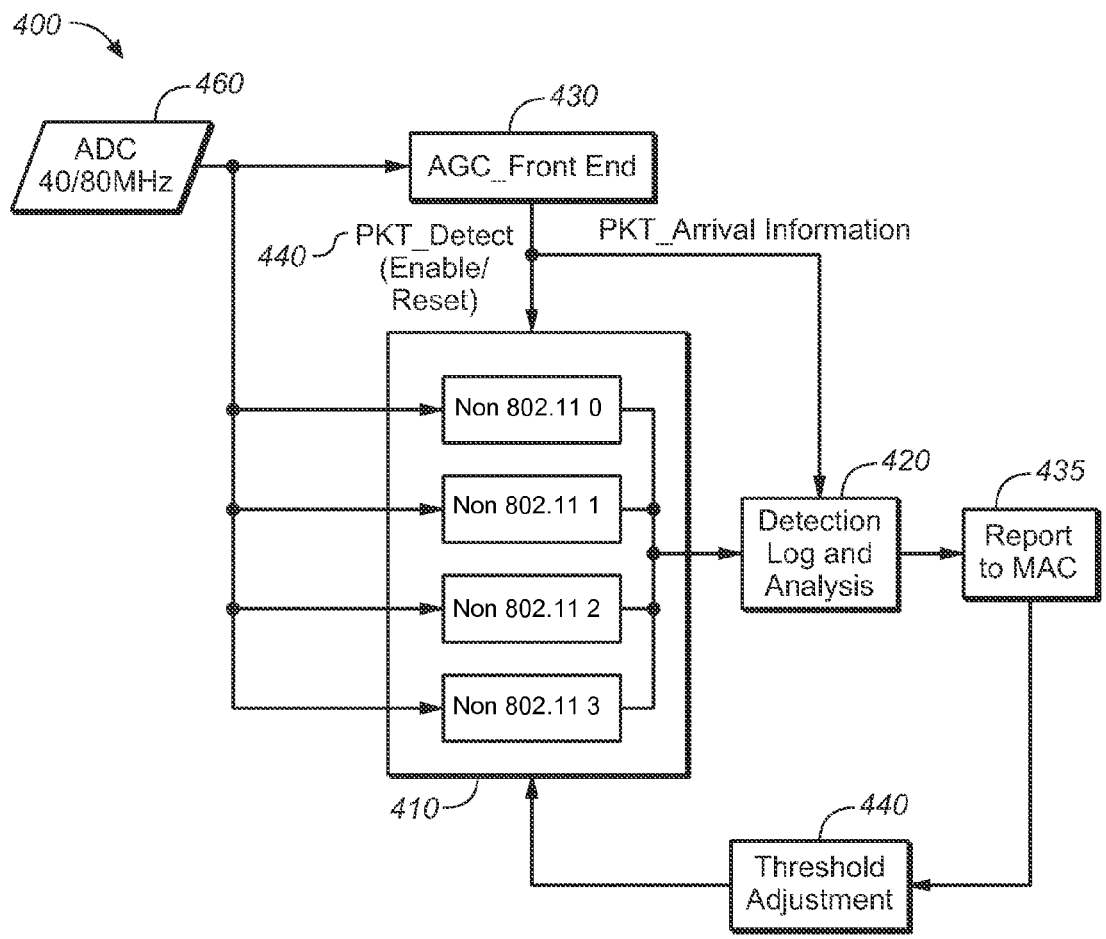
FIG. 4 depicts the non 802.11 architecture to detect various types of non 802.11 signatures, in accordance with one or more implementations.

FIG. 4 depicts the non 802.11 architecture 400 to detect various types of non 802.11 signatures, in accordance with one or more implementations;

From FIG. 4, the non 802.11 architecture 400, suitable for a system implementation, comprises a bank of detector modules 410 (e.g., 0-3, four shown) that can be individually tuned to handle different variety of non 802.11 types. The system architecture also provides for a Detection Log and Analysis module 420, an automatic gain control (AGC) state indication 430, the AGC Packet Detection function 440, a MAC reporting block 435, a threshold adjustment option at 450 and an analog to digital converter 460.

The Detection Log and Analysis module 420 records possible non 802.11 pulse events and uses pattern recognition algorithms to determine the presence of non 802.11 with a high degree of probability, and a low false detection rate. The AGC state indication 420 enables/resets various elements of the non 802.11 module. The AGC Packet Detection function 440 also serves to qualify/disqualify non 802.11 detection events in the Detection Log 420, where possible false non 802.11 "hits" are removed if energy bursts associated with data packets are determined.

From FIG. 4, the MAC reporting block 435 provides a report signal to the MAC layer for additional non 802.11 detection decisions/screening. At the MAC layer various measures to increase the reliability of non 802.11 detection are performed. These may include controlling the loading of network data loading to ensure good observation periods, and dynamically changing the thresholds in the various modules to either increase or decrease the non 802.11 detection system sensitivity to a particular non 802.11 pattern.

In FIG. 4, the non 802.11 detector modules 410 are programmable to detect random (like AFH), long-pulse (like hair dryer, radar, etc) or periodic types (like microwave, radar, etc) of non 802.11. These non 802.11 modes are functionally similar in structure, with each assessing for rising and falling energy conditions, and computing desired parameters when the energy exceeds a certain threshold.

For event logging and analysis, the detected energy pulses are sent from the detector modules 410. All of the occurrences of detected energy pulses are logged at 420 to determine the most likely non 802.11 pattern present. This is done by logging the time of arrival of the pulses, and any other associated non 802.11 parameter, such as tone frequency, tone energy, interference bandwidth, pulse width, chirp rate, etc. The periodicity will be determined by back-differencing the time-of-arrival values. To allow for missed non 802.11 pulses, both the fundamental non 802.11 period and integer multiples of the fundamental will be counted. When multiple occurrences of a particular period (or pulse width for long-pulse) are detected, the non 802.11 information will be passed to the MAC layer at 435. The MAC layer will then preferably respond with the proper non 802.11 avoidance operations.

For MAC detection, the MAC responsibility in non 802.11 detection is to maintain proper adjustment of the detection parameters. The MAC, for example, can respond to high false-detection rate by raising energy thresholds for a particular detector module. Similarly, if a certain non 802.11 is found to be present consistently, more than one detector module can be optimized for this particular pattern, to cover a wide range of non 802.11 signal strengths.

Operationally, the AP must detect non 802.11 while data packets are being received from the client. During this operation, the non 802.11 and WiFi packet may overlap from time to time, and the WiFi energy may be as strong as the non 802.11 pulse. A result of this overlap situation is that a 0 dB detection problem arises, where the WiFi signal is an equal strength noise source.

This result is problematic for traditional methods of detection, partly due to the 0 dB issue and partly as the situation is further complicated as the non 802.11 signatures may vary greatly. Thus, it will be appreciated by those skilled in the art that a single filter module is unable to accurately account for all non 802.11 types by providing allow optimal detection performance.

Figure 5:
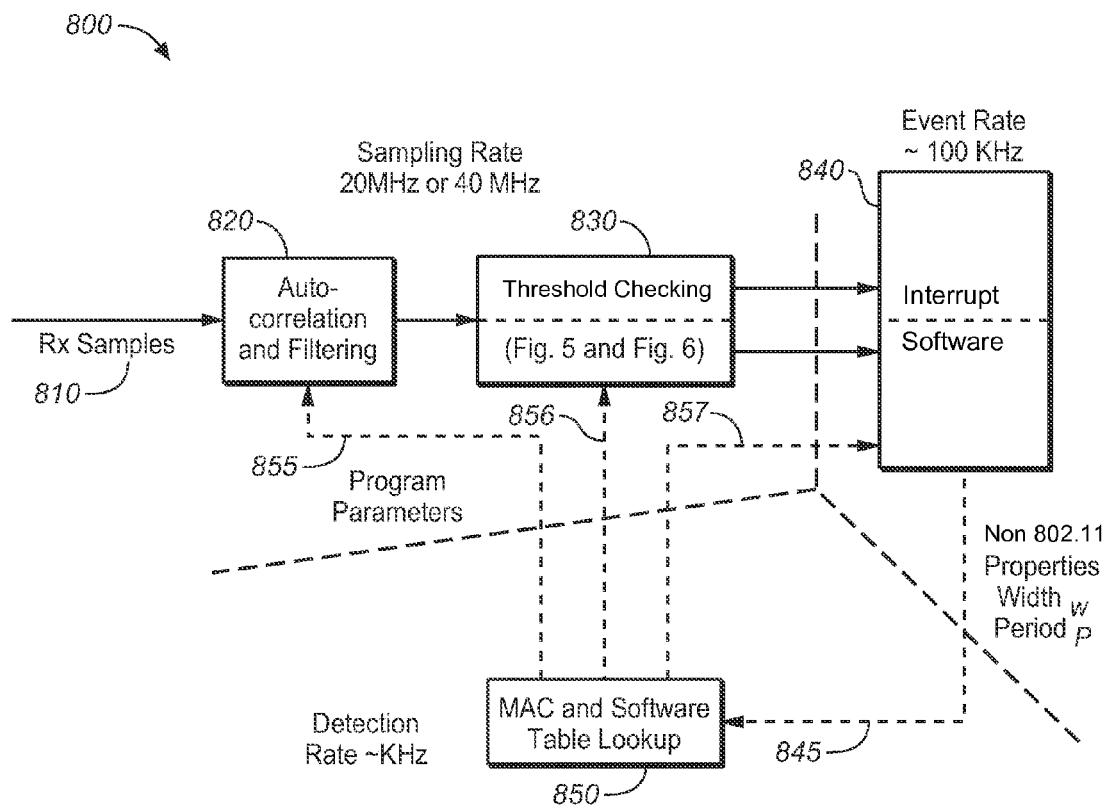
FIG. 5 depicts non 802.11 detection of individual pulses and/or patterns, in accordance with one or more implementations.

FIG. 5 depicts non 802.11 detection 800 of individual events which are uniquely determined by event parameters and time of arrival, in accordance with one or more implementations. From FIG. 5, an arrangement of earlier described figures and processes is procedurally set forth. At 810 the non 802.11 data is received and cross-correlation and filtering at 820. The output of the cross-correlation and filtering is input as one of the inputs for threshold checking interrupt software. The output of the threshold checking 830 is provided and recorded at 845 to the MAC layer at 850, and prior data is available from the MAC layer for use in the respective process of cross-correlation 820, threshold checking 830 and/or interrupt software 840, along 855, 856 and 857 respectively, as previously described.

In embodiment it is known that different signals, that are going to be encountered by the system, have various characteristics. For example:
Packet
  High energy
  Minimal Cross-correlation
  Well defined start and end
Noise
  Low energy
  Long term average=0
Non-802.11
  Low-to-high energy
  Well defined cross-correlation and/or event parameters It is known that the deterministic preamble and random data have different statistical characteristics than non-802.11 signals. These characteristics are defined by the equation:

$$y = \sum_{n=0}^{N-1} x[n]x^*[n-\Delta]$$

where y is the input and x is the output.

When cross-correlation is utilized, random data is eliminated and Noise is averaged to 0. Carrier (of frequency ω and amplitude A) is equal to $N|A|^2 e^{j\omega\Delta}$ Samples of noise and wide-band data that are farther away will be less correlated. RF and external environment will also affect the carrier signal which will limit the optimal value of delta ($\Delta$). $\Delta$ is kept flexible in the current design. Because of deterministic preamble, some choices of $\Delta$ are detrimental. More averaging reduces the variance of noise. Time variations in non 802.11 signal will limit long term accumulation. Optimal choice of N is also kept flexible. Data systems typically have an Automatic Gain Control (AGC) to best utilize the A/D converters. The AGC will vary the amplitude A for the desired carrier radar on non-802.11 signal. Therefore the value of y can be renormalizing using the gain control values from the AGC and by local calculation of $|x[n]|$ and $|x[n-\Delta]|$.

The strength of the signal y can be used to measure A. Number of zero crossings of y can provide information about ω. Multiple measurements of these parameters can be averaged to get their nominal (noise-free) values.

In the presence of carrier radar or in-band AFH type non-802.11 signals a long term accumulation of y is a monotonically increasing sequence. Using a configurable threshold, the software (through an interrupt or control register) can be initiated, indicating a possible radar or non-802.11 signal is detected. A higher threshold will result in a longer time to generate interrupt, and a lower threshold will result in a shorter time to generate the interrupt. The software will obtain the parameters from the system and will perform a look-up-table validation of all the relevant parameters: frequency, strength, type, etc. The threshold can also be appropriately chosen to meet a "Channel Availability Check Time" requirement.

Advantages

Cross-correlation reduces the effect of random data. Averaging reduces the effect of noise and data. The output of the cross-correlation provides all the useful event parameters. Data path will determine the 20 MHz/40 MHz operation. A suitable choice of $\Delta$ and N will eliminate false triggers. Software interaction is reduced to setting the parameters and reacting to interrupts (which are almost guaranteed to be radar).

One of the numerous advantages over the prior methods is that in one or more implementations, non 802.11 detection is able to run in parallel with normal packet processing. The advantage is that high data throughput can be maintained while the AP actively seeks to detect the presence of non 802.11. Also, by filtering for specific non 802.11 patterns, the signal-to-noise ratio of the non 802.11 signal can be improved, particularly during WiFi operation. This enhances the detection rate, and lowers the probability of false alarms.

A further advantage in one or more implementations is that the back-difference buffer also enables the detection to occur reliably during WiFi operation by logging non 802.11 events between WiFi packets. By logging the non 802.11 pulse times and durations, the non 802.11 timeline can effectively be reconstructed and compared to known non 802.11 patterns. This enhances the reliability of detection compared to looking for a single set of contiguous non 802.11 pulse, by allowing for the non 802.11 pulse train to be interrupted by noise or WiFi packets.

As used herein, the term WiFi transceivers are widely used in wireless applications including ETSI DVB-T/H digital terrestrial television transmission and IEEE network standards such as 802.11 ("WiFi"), 802.16 ("WiMAX"), 802.20 (proposed PHY). Such transceivers have large arithmetic processing requirements which can become prohibitive if implemented in software on a DSP processor.

The present invention in one or more implementations may be implemented as part of a data system, an application operable with a data system, a remote software application for use with a data storage system or device, and in other arrangements.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

Various implementations of a non 802.11 detection methodologies and systems have been described. Nevertheless, one of ordinary skill in the art will readily recognize that various modifications may be made to the implementations, and any variations would be within the spirit and scope of the present invention. For example, the above-described process flow is described with reference to a particular ordering of process actions. However, the ordering of many of the described process actions may be changed without affecting the scope or operation of the invention. Accordingly, many modifications may be made by one of ordinary skill in the art without departing from the spirit and scope of the following claims.

What is claimed is:

1. A configurable wireless detection system comprising:
one or more non 802.11 detector modules to detect one or more non 802.11 signals, wherein each module is capable of detecting non 802.11 signals from different non 802.11 devices;
a detection log and analysis module to determine non 802.11 device presence from the one or more detected non 802.11 signals, wherein the detection log and analysis module includes a pattern recognition process to determine the non 802.11 device presence;
an automatic gain controller for controlling one or more detection parameters of the one or more non 802.11 detector modules; and
a report signal for reporting the one or more detected non 802.11 signals.

2. The system of claim 1, wherein the pattern recognition process is verified by a validation process against one or more known non 802.11 signal templates.

3. The system of claim 1, further comprising a WiFi device.

4. The system of claim 3, wherein the WiFi device is a WiFi access point capable of communication with one or more client devices and the non 802.11 detector modules are individually programmable.

5. The system of claim 4, wherein the access point further comprises a baseband module and a medium access control module, wherein the baseband module provides filtering on a received non 802.11 signal to remove non 802.11 signal energy, and the medium access control module compares a received non 802.11 signal with one or more known non 802.11 patterns.

6. The system of claim 5, wherein the report signal is a control message sent by the access point to one or more client devices.

7. The system of claim 6, wherein the control message includes instructions to one or more client devices for one or more of change operating channels for communication, cease communications on present channel, identification of one or more non 802.11 signal transmissions, delayed transmission information, changed bandwidth of operation, or future communication channel frequency.

8. The system of claim 7, wherein the access point is operable in an unlicensed radio band range.

9. The system of claim 7, wherein the filtering is provided utilizing cross-correlation.

10. The system of claim 9, wherein the filter comprises:

$$y(k) = \sum_{j=0} x(k-j)x^*(k-j-T),$$

where x(k) is input, y(k) is output, N is length of autocorrelation average, T, which is delay.

11. The system of claim 10 including transceiver and has a plurality of non 802.11 detection modules.

12. The system of claim 3 wherein the report signal is a control message sent by the device to one or more client devices of the device.

13. A system for detecting non 802.11 signals on an unlicensed radio band, comprising a radio frequency to baseband converter for converting received non 802.11 signals, a baseband module for filtering and logging received non 802.11 signals, a medium access control module for identifying received non 802.11 signals in comparison with one or more known non 802.11 signal types, wherein the medium access control module includes a pattern recognition process to identify the received non 802.11 signals, and reporting across a communication network information regarding received non 802.11 signals.

14. The system of claim 13, wherein the medium access control is comprised of program instructions and the communication network comprises one or more client devices.

15. The system of claim 13 further wherein a report is generated reporting status of received non 802.11 signals to one or more client devices of the communication network.

16. A method on a communication network capable of detecting non 802.11 signals and automatically notifying client devices in communication with a device to one or more of changing communication channel, delaying communication and ceasing communication for detecting and avoiding one or more non 802.11 signals and communicating information regarding detected non 802.11 signals stored on a data storage device accessible by the data system, the method comprising:
receiving one or more non 802.11 signals;
filtering received one or more non 802.11 signals;
identifying a status of the filtered one or more non 802.11 signals as being false or true, wherein the status is identified using a pattern recognition process;
notifying one or more client devices on the communication network as to a status of the identified one or more non 802.11 signals; and
automatically communicating with one or more client devices.

17. The method of claim 16, wherein the step of automatically communicating with one or more client devices includes instructions of one or more of changing operating channels for communication, ceasing communications on present channel, identifying one or more non 802.11 signal transmissions, providing delayed transmission information, changed bandwidth of operation, or directing future communication channel frequency.

18. The method of claim 16, further comprising providing filtering on a received non 802.11 signal to remove non 802.11 signal energy, and comparing a received non 802.11 signal with one or more known non 802.11 patterns.

* * * * *